(12) United States Patent
Ukai

(10) Patent No.: US 12,017,874 B2
(45) Date of Patent: Jun. 25, 2024

(54) ORIENTATION SWITCHING APPARATUS

(71) Applicant: Murata Machinery, Ltd., Kyoto (JP)

(72) Inventor: Yasuhiro Ukai, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 581 days.

(21) Appl. No.: 17/291,677

(22) PCT Filed: Sep. 20, 2019

(86) PCT No.: PCT/JP2019/036895
§ 371 (c)(1),
(2) Date: May 6, 2021

(87) PCT Pub. No.: WO2020/105268
PCT Pub. Date: May 28, 2020

(65) Prior Publication Data
US 2022/0002086 A1  Jan. 6, 2022

(30) Foreign Application Priority Data

Nov. 19, 2018  (JP) .................................. 2018-216879

(51) Int. Cl.
*B65G 7/08* (2006.01)
*B65G 57/28* (2006.01)

(52) U.S. Cl.
CPC .............. *B65G 7/08* (2013.01); *B65G 57/28* (2013.01); *B65G 2201/0273* (2013.01)

(58) Field of Classification Search
CPC ... B65G 7/08; B65G 57/28; B65G 2201/0273
See application file for complete search history.

(56) References Cited

U.S. PATENT DOCUMENTS 5,340,260 A * 8/1994 Turra ................... B65H 19/123
414/528
5,480,277 A * 1/1996 Minz ....................... B65G 65/23
414/21

(Continued)

FOREIGN PATENT DOCUMENTS

EP  2 589 566 A1  5/2013
JP  57-106623 U  12/1980

(Continued)

OTHER PUBLICATIONS

Office Action dated Mar. 8, 2023, of counterpart Taiwanese Patent Application No. 108140284, along with an English machine translation.

*Primary Examiner* — Saul Rodriguez
*Assistant Examiner* — Ashley K Romano
(74) *Attorney, Agent, or Firm* — DLA Piper LLP (US)

(57) ABSTRACT

An orientation switching apparatus capable of placing a pallet which is in a vertical orientation and holding a group of tires in a stacked state into a horizontal orientation, and placing a pallet which is in a horizontal orientation and holding a group of tires in a horizontally arranged state into the vertical orientation, includes: a base that holds the pallet; a switching drive device which switches the orientation of the pallet held, by rotating the base; a standing device which pushes a leaning tire located at one end of the group of tires toward the other end to cause the leaning tire to stand; and a restricting device which restricts movement of the tires.

15 Claims, 15 Drawing Sheets

(56) References Cited

U.S. PATENT DOCUMENTS

| | | | | |
|---|---|---|---|---|
| 5,562,401 A | * | 10/1996 | Drew | B65H 1/00 |
| | | | | 414/778 |
| 5,681,141 A | | 10/1997 | Critel | |
| 6,357,599 B1 | * | 3/2002 | Morrison | B65G 59/106 |
| | | | | 209/509 |
| 6,527,499 B2 | * | 3/2003 | Leimbach | B65D 85/06 |
| | | | | 414/792.5 |
| 7,052,228 B2 | * | 5/2006 | de Jong | B65G 57/20 |
| | | | | 414/789.2 |
| 9,475,659 B2 | * | 10/2016 | Strickland, III | B65G 59/08 |
| 9,610,963 B2 | * | 4/2017 | Jensen | B62B 3/104 |

FOREIGN PATENT DOCUMENTS

| | | |
|---|---|---|
| JP | 60-252529 A | 12/1985 |
| JP | H07-2521 B2 | 1/1995 |
| JP | 2011-256041 A | 12/2011 |

\* cited by examiner

ORIENTATION SWITCHING APPARATUS

TECHNICAL FIELD

This disclosure relates to an orientation switching apparatus that switches an orientation of a pallet that holds tires, between a vertical orientation in which the tires are held in a stacked state and a horizontal orientation in which tires are held in a horizontally arranged state.

BACKGROUND

Conventionally, as a method of storing tires, there is a method in which horizontally oriented tires are stored by being piled several tires high in a so-called stacked state (stacked flat). Furthermore, there is a method in which vertically oriented tires are arranged, in a so-called horizontally arranged state, on a pallet not to roll about.

Japanese Examined Patent Application Publication No. H07-2521 describes an apparatus that automatically switches the orientation of tires in a stacked state to a horizontally arranged state, and places the tires on a pallet.

In the technique described in JP '521, the orientation of the tires is switched between the horizontally arranged state and the stacked state. When a plurality of horizontally arranged tires are collectively placed in the stacked state, there are instances when the tires are piled in a misaligned state. When tires are stacked in such a misaligned state, problems such as not being able to insert the holding device of a gantry crane through the tires occur and, thus, it is necessary to maintain a stacked state with no misalignment.

It could therefore be helpful to provide an orientation switching apparatus capable of switching the orientation of horizontally arranged tires to a stacked state without misalignment, as well as orientation switching in the opposite direction.

SUMMARY

We thus provide:

An orientation switching apparatus capable of placing a pallet that is in a horizontal orientation and holds a group of tires into a vertical orientation together with the group of tires, the group of tires being in a horizontally arranged state in which vertically oriented tires are lined up, includes: a base configured to hold the pallet; a switching drive device configured to switch an orientation of the pallet that is held, by rotating the base; a standing device configured to push a leaning tire, which is a tire of the group of tires located at one end of the group of tires held in the pallet, toward the other end of the group of tires to cause the leaning tire to stand; and a restricting device configured to restrict movement of the group of tires by abutting at least a portion of circumferential surfaces of the group of tires.

Accordingly, since it is possible to switch the orientation of the tires together with the pallet while movement of the tires is restricted by the restricting device, misalignment of the tires during orientation switching can be prevented. Furthermore, since switching from the horizontally arranged state to the stacked state can be performed in a state in which the leaning tire has been made to stand by the standing device, misalignment between tires can be prevented and the tires in the stacked state can be easily transported by a gantry crane.

Furthermore, the standing device may include: a pushing component configured to apply, on the leaning tire, a pushing force toward the other end of the group of tires; an advancing device configured to advance and retract the pushing component between the leaning tire and the pallet; and a moving device configured to generate, for the pushing component that is in an advanced state, the pushing force toward the other end that is to be applied on the leaning tire.

Accordingly, it is possible to flexibly handle tires of various diameters as well as various orientations of leaning tires.

The pushing component may include a roller configured to come into contact with the leaning tire and roll. Accordingly, friction between the tire and the pushing component can be reduced and, thus, the tire can be easily made to stand.

The standing device may be attached to the base and may be configured to move in conjunction with the switching of the orientation of the pallet. The restricting device may be attached to the base and may be configured to move in conjunction with the switching of the orientation of the pallet. Accordingly, even during orientation switching, individual tires can be steadied and, thus, misalignment between tires can be reduced.

We thus enable orientation switching of tires between a stacked state and a horizontally arranged state while reducing misalignment between the tires.

Figure 1:
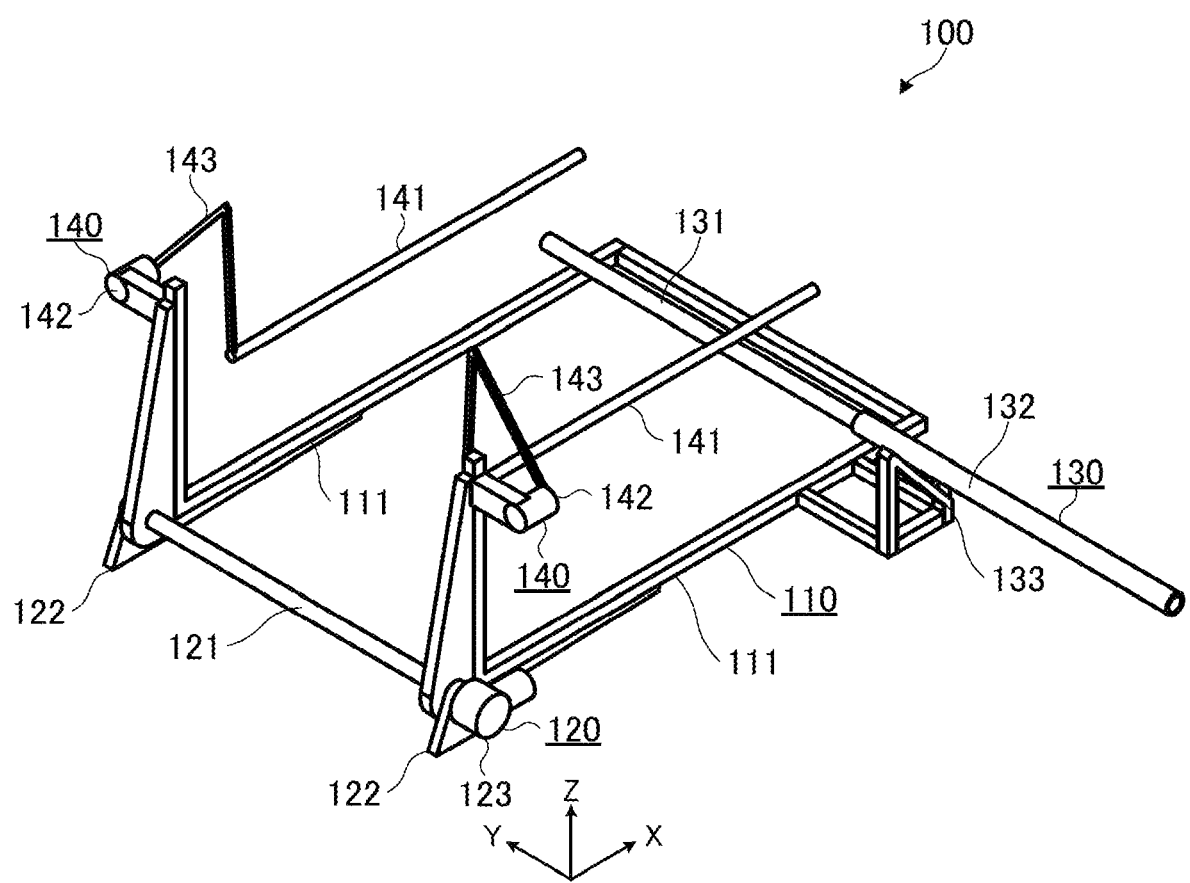
FIG. 1 is a perspective view of an orientation switching apparatus according to Example 1.

REFERENCE SIGNS LIST 100 orientation switching apparatus
110 base
111 holding component
120 switching drive device
121 axle
122 axle bearing
123 driving source
130 standing device
131 pushing component
132 advancing device
133 moving device
134 rail
140 restricting device
141 abutting component
142 separating device
143 arm component
200 tire
201 leaning tire
300 pallet
310 horizontal placement member
320 vertical placement member
330 frame
340 stopper
350 spacer

DETAILED DESCRIPTION

Hereinafter, examples of an orientation switching apparatus will be described with reference to the Drawings. Each of the examples described below shows a generic or specific configuration. Numerical values, shapes, materials, structural components, the arrangement and connection of the structural components, and so on, described in the subsequent examples are merely representative and, thus, not intended to limit this disclosure. Furthermore, among the structural components in the subsequent examples, structural components that are not described in an independent claim that recites the broadest concepts are described as optional structural components.

Furthermore, the figures are schematic diagrams in which emphasis, omission, and adjustment of scale have been carried out as appropriate to illustrate our apparatus, and thus may be different from the actual shapes, positional relationships, and scales.

Example 1

Figure 2:
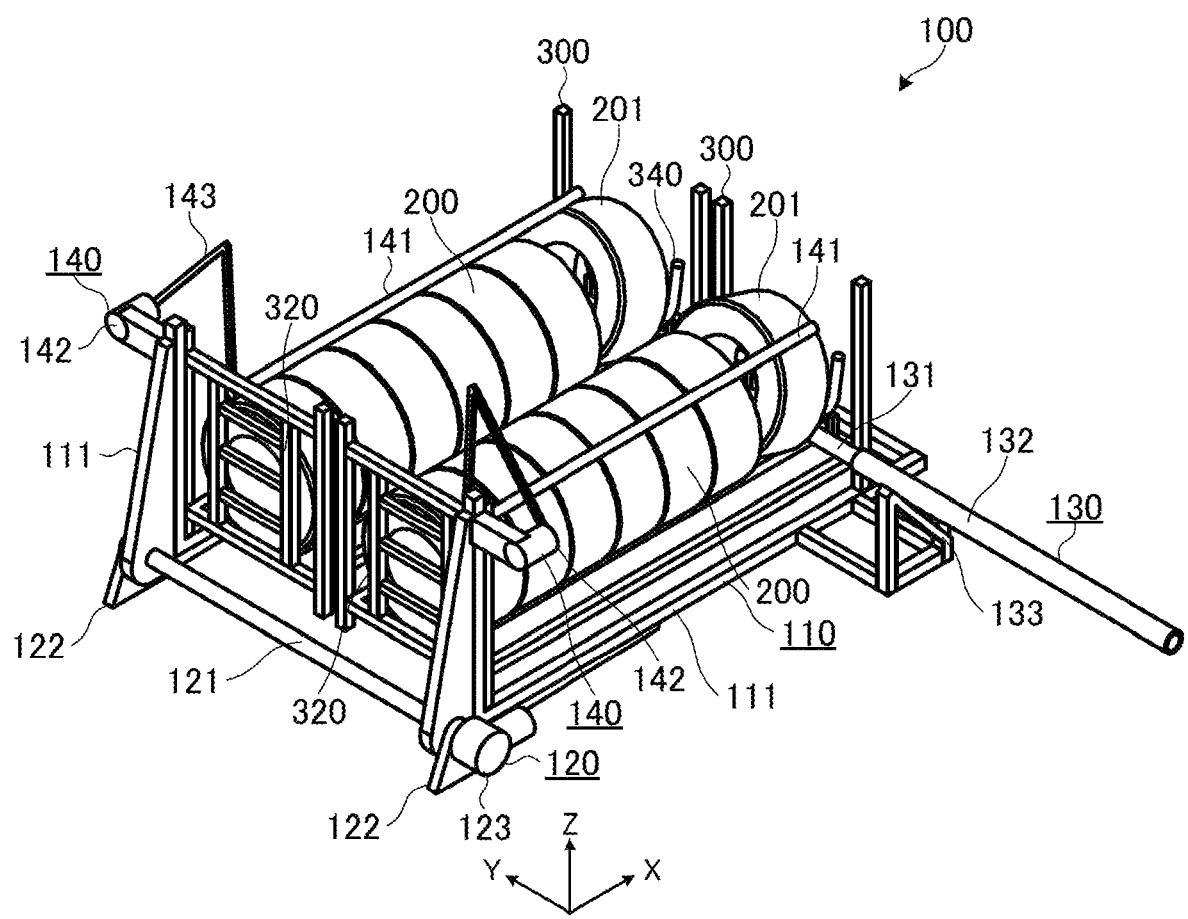
FIG. 2 is a perspective view of the orientation switching apparatus according to Example 1 holding horizontally arranged tires held in a pallet.
Figure 3:
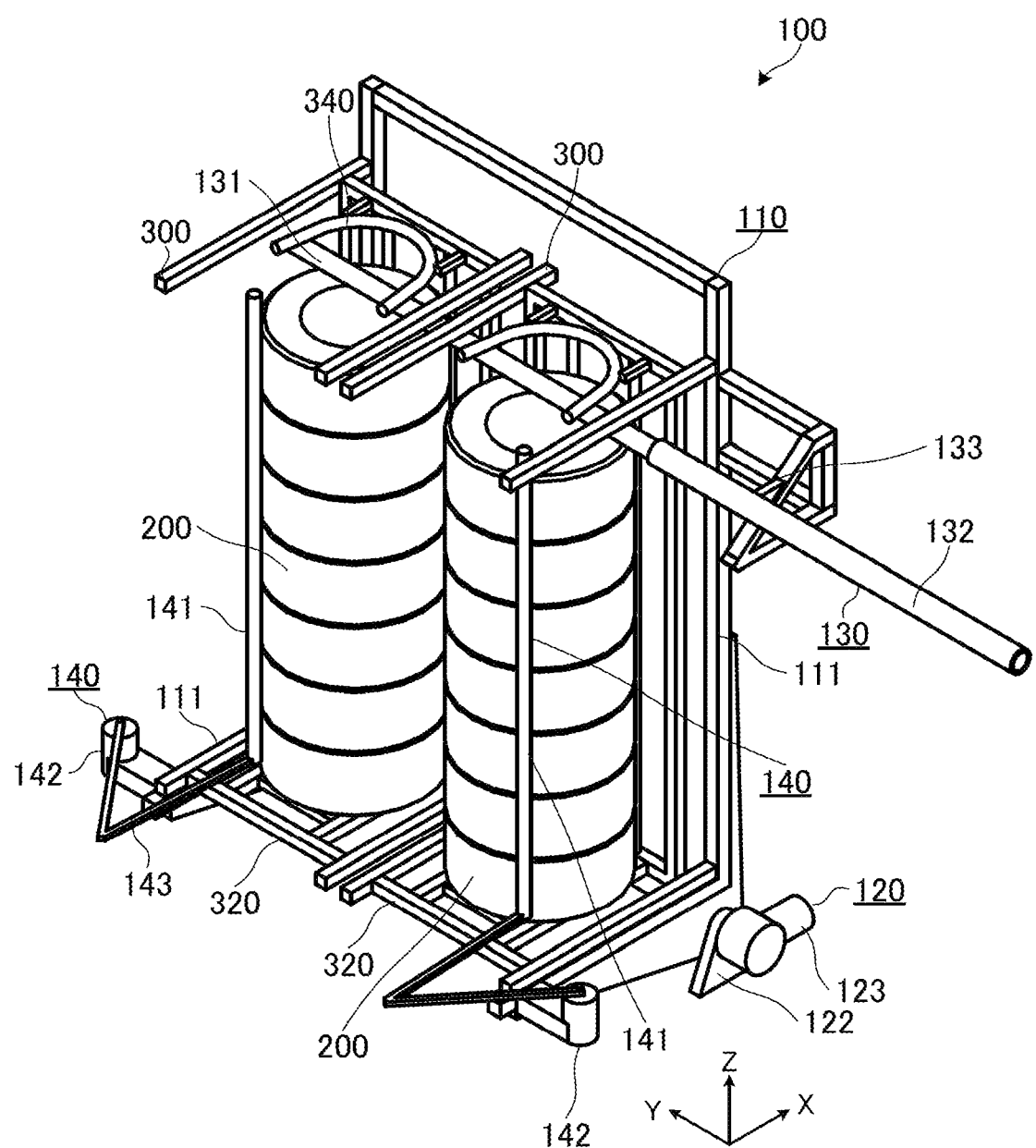
FIG. 3 is a perspective view of the orientation switching apparatus according to Example 1 holding stacked tires held in the pallet.

FIG. 1 is a perspective view of an orientation switching device according to Example 1. FIG. 2 is a perspective view of the orientation switching apparatus holding horizontally arranged tires held in a pallet. FIG. 3 is a perspective view of the orientation switching apparatus holding stacked tires held in a pallet. Orientation switching apparatus 100 is an apparatus that places pallet 300, which holds a group of tires that are in a horizontally arranged state in which vertically oriented tires 200 are lined up as illustrated in FIG. 2, in the vertical orientation illustrated in FIG. 3 together with the group of tires, and places pallet 300, which holds the group of tires that are a stacked state in which horizontally oriented tires 200 illustrated in FIG. 3, in the horizontal orientation illustrated in FIG. 2 together with the group of tires. Orientation switching apparatus 100 includes base 110, switching drive device 120, standing device 130, and restricting device 140.

Tires 200 to be switched to the stacked state and the horizontally arranged state by orientation switching apparatus 100 are not limited to a particular type, and may be tires used for mid-size vehicles such as cars, tires using in large vehicles such as trucks and buses, tires used in agricultural machines or construction machines, and so on. Furthermore, the group of tires in Example 1, the claims, and so on, refer to one group of tires 200 which are held in pallet 300. Furthermore, tire 200 located at an end of the horizontally arranged group of tires which is not vertically oriented, but leaning on pallet 300 is referred to as leaning tire 201. Leaning tire 201 is one of tires 200, and ceases to be leaning tire 201 when it is placed in the vertically oriented state from the leaning state.

Figure 4:
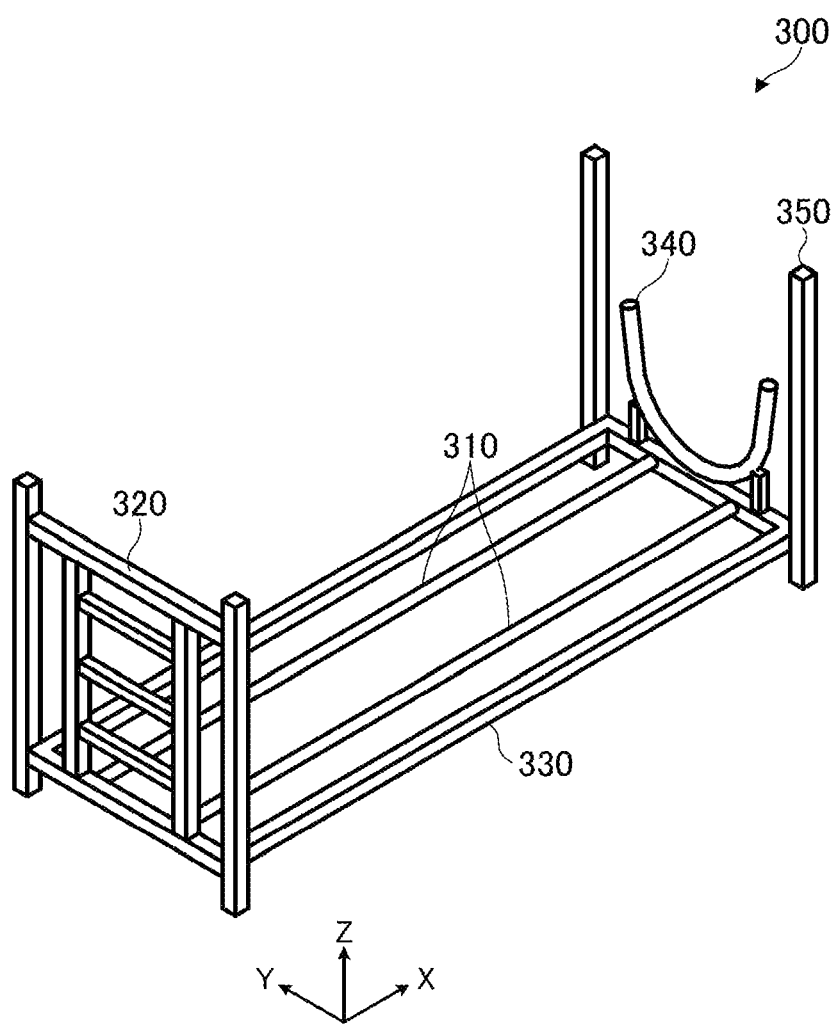
FIG. 4 is a perspective view the pallet according to Example 1.

Pallet 300 which is the object of the orientation switching by orientation switching apparatus 100 includes: horizontal placement member 310 on which each of horizontally arranged tires 200 are placed when pallet 300 is in the horizontal orientation illustrated in FIG. 4; and vertical placement member 320 on which stacked tires 200 are placed when pallet 300 is in the vertical orientation (see FIG. 3). In Example 1, pallet 300 includes frame 330 in which vertical placement member 320 is disposed at an end of horizontal placement member 310 to project in a direction which crosses horizontal placement member 310. Pallet 300 includes, on the side of horizontal placement member 310 which is opposite to vertical placement member 320 to be located opposite vertical placement member 320, stopper 340 which supports and prevents leaning tire 201 from falling. Pallet 300 includes pillar-shaped spacers 350 that extend in the projection direction of vertical placement member 320 (the Z-axis direction in FIG. 4). Spacer 350 is attached to each of the four corners of rectangular frame 330 and has a function of enabling horizontally oriented pallets 300 to be stacked while holding the group of tires, by connecting upper ends and lower ends of spacers 350 of two pallets 300.

In the vertical orientation, pallet 300 is structured to allow it to receive a stacked group of tires transported by a crane such as a gantry crane, or to transfer the group of tires it is holding to the crane. Specifically, stopper 340 is shaped like the letter U or letter V, for example, to at least be able to abut the lateral surface of a held tire 200 at multiple locations to support tire 200 without blocking the hole (i.e., the hole to which a wheel is attached) of tire 200, and to have, on the side of tires 200 opposite horizontal placement member 310, a gap through which a chuck can pass. Furthermore, stopper 340 is disposed on frame 330 to not interfere with the chuck of a crane that is inserted through the holes of tires 200 and holds the group of tires from the inside when the group of tires is transported using the crane.

Pallet 300 is capable of holding tires 200 of different diameters, and can hold, for example, tires 200 that are 1.5 times larger in diameter than the smallest tires 200 that can be held. Furthermore, pallet 300 includes a connector (not shown in the figures) that connects with another pallet 300, and a plurality of pallets 300 such as two pallets 300 and so on can be used as a single pallet. In Example 1, orientation switching apparatus 100 is capable of switching the orientation of two connected pallets 300 at once. Orientation switching apparatus 100 may switch the orientation of a single pallet 300, or may be capable of switching the orientation of three or more pallets 300 all at once.

Base 110 is a structural component that holds pallets 300. Base 110 can hold horizontally oriented pallets 300, continue to hold pallets 300 even during orientation switching up to the vertical orientation, and continue to hold pallets 300 even during orientation switching in the reverse direction. In Example 1, base 110 has a structure in which two L-shaped holding components 111 disposed along horizontal placement member 310 and vertical placement member 320 of pallets 300 are connected at opposite locations. Furthermore, base 110 is capable of holding two connected pallets 300 even during orientation switching with each pallet holding a group of tires.

In Example 1, base 110 is structured to be able to transfer the horizontally oriented pallets 300 to a transporting device (not shown in the figures) disposed under base 110. Specifically, holding component 111 of base 110 can pass between rollers of a roller conveyor which is the transporting device, and place the held pallets 300 on the roller conveyor. Accordingly, the roller conveyor can transport the horizontally oriented pallets 300 that have been placed thereon. Furthermore, horizontally oriented pallets 300 that have been transported by the roller conveyor up to base 110 can be held by base 110 and switched in orientation to the vertical orientation.

Switching drive device 120 is a device capable of rotating base 110 about a predetermined rotation axis (a rotation axis parallel to the Y-axis in the figures) to switch the orientation of the held pallets 300 from the horizontal orientation to the vertical orientation, or switch the orientation in the opposite direction. In Example 1, switching drive device 120 includes: axle 121 which is disposed near the outer side of the corners of holding component 111 of base 110 and fixed to base 110; axle bearings 122 which rotatably hold axle 121 and are fixed to the floor surface and the like; and driving source 123 which includes reduction gears and a motor for rotating axle 121. Orientation switching apparatus 100 is not limited to driving by motor, and may rotate base 110 using an actuator such as an air cylinder.

Figure 5:
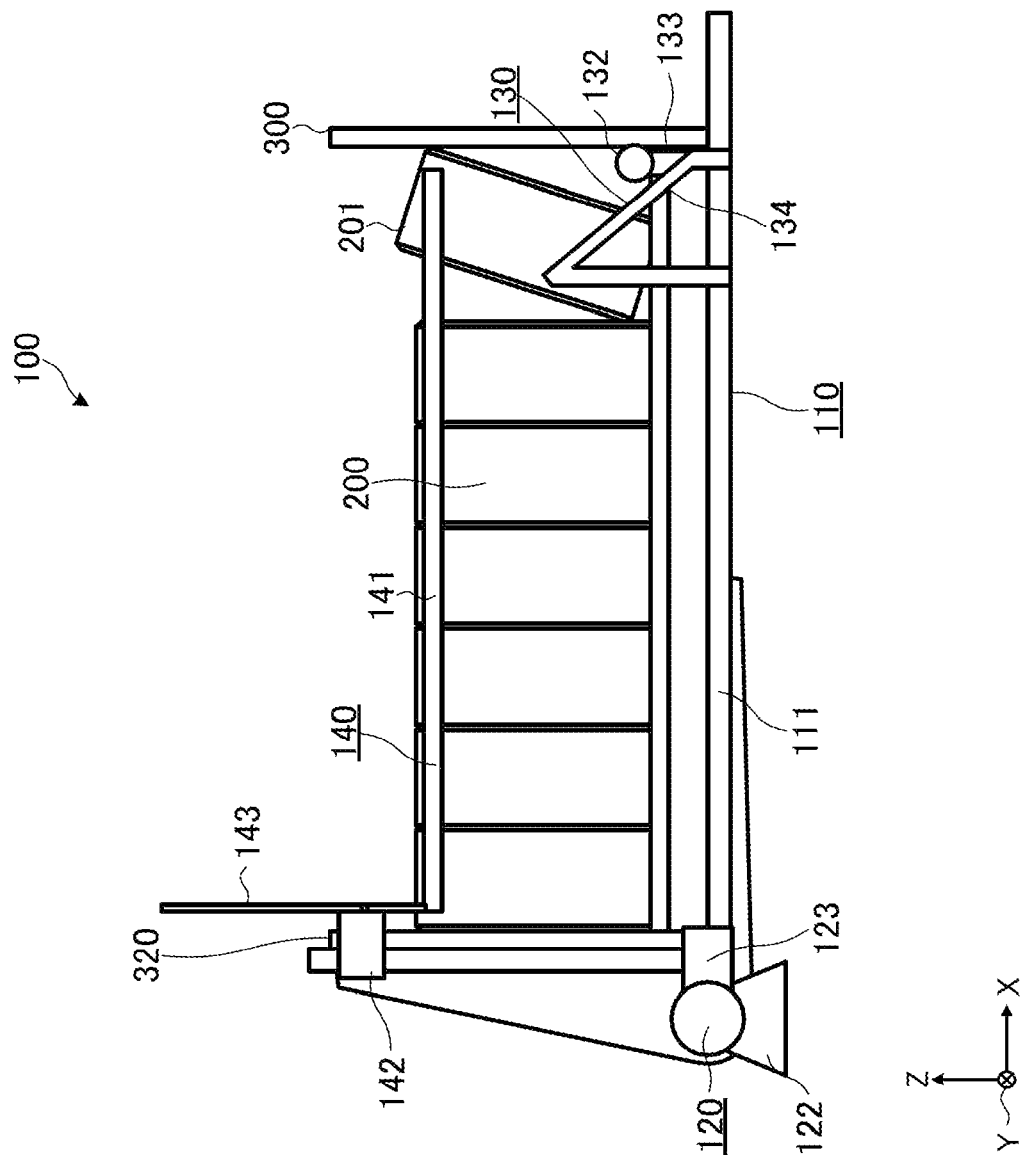
FIG. 5 is a side view of the orientation switching apparatus according to Example 1 before causing a leaning tire to stand upright.

Standing device 130 is a device that causes leaning tire 201, which is a leaning tire 200 located at one end of the horizontally arranged group of tires, to stand toward the vertical placement 320-side which is the other end, as illustrated in FIG. 5. Although there is no particular limitation as to the specific configuration of standing device 130, in Example 1, standing device 130 is a device capable of simultaneously causing leaning tires 201 included in each of two groups of tires held in two connected pallets 300 to stand, and includes pushing component 131, advancing device 132, and moving device 133.

Furthermore, in Example 1, standing device 130 is attached to base 110 and moves in conjunction with the switching of the orientation of pallets 300 by switching drive device 120. Standing device 130 is also capable of moving in conjunction with base 110, with leaning tires 201 kept in the standing state.

Pushing component 131 is a component that applies, on leaning tires 201, a pushing force toward the other end of the group of tires. Although there is no particular limitation as to the specific shape of pushing component 131, in Example 1, pushing component 131 is rod-shaped when seen as a whole, and includes an shaft, and a roller which is disposed coaxially around the circumference of the shaft and comes into contact with leaning tires 201 and rolls about the shaft. The roller is a resin pipe. The roller may be disposed over approximately the entire length of pushing component 131, or a plurality of rollers may be intermittently disposed along pushing component 131. In this manner, since pushing component 131 includes the roller, it is possible to reduce the friction generated between the surface of leaning tires 201 and pushing component 131 when leaning tires 201 are made to stand.

Furthermore, in Example 1, pushing component 131 extends along the rotation axis of base 110 (the Y-axis direction in the figures), is of a length that approximately overlaps with the two groups of tires disposed on each of two pallets 300 held by base 110, and has the strength (rigidity) to be able to simultaneously cause leaning tires 201 included in each of the two groups of tires to stand.

Pushing component 131 may be a single piece or may be divided into multiple components that expand and contract. Pushing component 131 having, for example, a telescopic structure can be given as an example.

Advancing device 132 is a device which causes pushing component 131 to advance and retract in a direction that follows the rotation axis of base 110, between leaning tires 201 and pallets 300, and specifically between respective leaning tires 201 and stoppers 340 of pallets 300. In Example 1, advancing device 132 can, by way of an air cylinder, cause pushing component 131 to advance in a single stroke, from a position in which the tip of pushing component 131 does not overlap with the nearest pallet 300 to a position in which pushing component 131 overlaps the two groups of tires, and, conversely, cause pushing component 131 to retract in a single stroke.

The driving means of advancing device 132 is not limited to an air cylinder, and may be a device implemented by a combination of a linear motor or rotary motor and mechanical parts such as gears.

Figure 6:
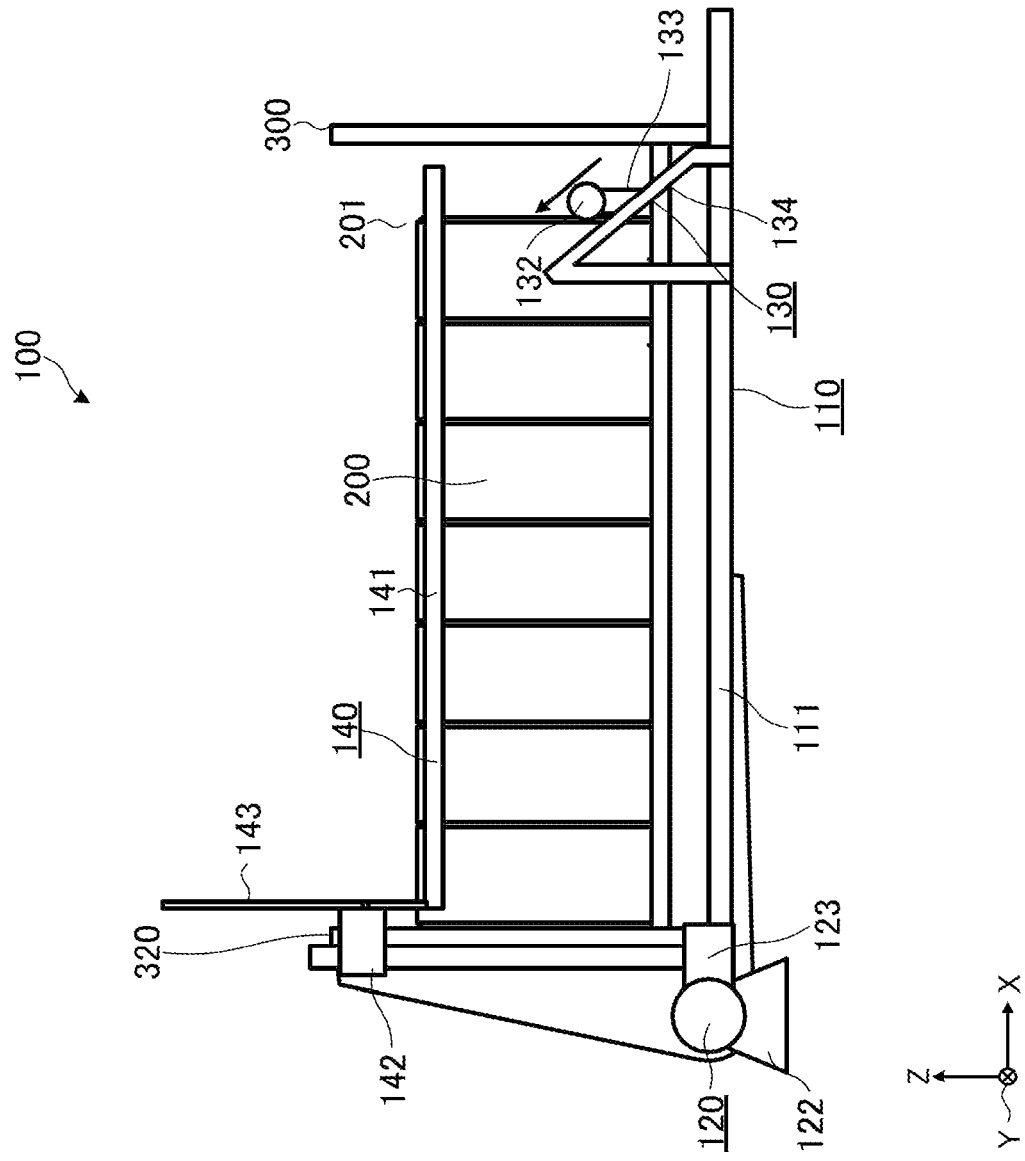
FIG. 6 is a side view of the orientation switching apparatus according to Example 1 after causing a leaning tire stand upright.

Moving device 133 is a device that generates, for pushing component 131 that is in the advanced state, the pushing force to move leaning tires 201 toward the other end. In Example 1, moving device 133 causes parallel translation of pushing component 131 together with advancing device 132. Specifically, rail 134 (see FIG. 5 and FIG. 6) is provided disposed at a predetermined angle with respect to the extension direction (the X-axis direction in the figures) of horizontal placement members 310 of pallets 300 held in base 110, and advancing device 132, which is attached to rail 134 in a slidable manner, is driven along rail 134 by moving device 133 by way of an air cylinder. The air pressure that is input to the air cylinder when causing pushing component 131 together with advancing device 132 to move in the direction for causing leaning tires 201 to stand can be adjusted by a regulator, and leaning tires 201 of different diameters can be universally made to stand by controlling the pressure.

The direction in which moving device 133 moves pushing component 131 is not limited to a straight line. For example, pushing component 131 which is in the advanced state may be made to revolve around an axis that is parallel or approximately parallel to the rotation axis of base 110. The driving means of moving device 133 is not limited to an air cylinder, and may be a device implemented by a combination of a linear motor or rotary motor and mechanical parts such as gears. In other words, the trajectory of pushing component 131 when causing leaning tires 201, is not only linear, but may also be curved, bent, and so on. Furthermore, to enhance the versatility of orientation switching apparatus 100, the final position in the trajectory of pushing component 131, that is, the position of pushing component 131 when leaning tires 201 assume the state of vertically oriented tires 200, is preferably near the top portion of the smallest diameter tire 200 that can be held by pallets 300.

Furthermore, when standing device 130 is causing leaning tires 201 to stand, it is preferable that pushing component 131 which is in the retracted state be advanced in the inside corner defined by respective horizontal placement members 310 and stoppers 340. This is because the above configuration increases the possibility that pushing component 131 can be advanced without interfering with leaning tires 201, regardless of the diameter of leaning tires 201 that are resting on stoppers 340

Restricting devices 140 abut at least a portion of the circumferential surfaces of tires 200 held by orientation switching apparatus 100 to restrict movement of each of tires 200 in the groups of tires. Although there is no particular limitation as to the specific configuration of restricting device 140, in Example 1, restricting device 140 includes abutting component 141, separating device 142 which separates abutting component 141 from the group of tires, and arm component 143 which connects abutting component 141 and separating component 142.

Furthermore, in Example 1, each restricting device 140 is attached to base 110 and moves in conjunction with the switching of the orientation of pallet 300 by switching drive device 120. Restricting device 140 can move in conjunction with base 110 while abutting the circumferential surfaces of the group of tires.

In Example 1, two groups of tires are held by base 110 via two pallets 300 and, to restrict movement of tires 200 of each group of tires, orientation switching apparatus 100 includes two restricting devices 140. Furthermore, the two restricting devices 140 are configured plane symmetrically including the direction of operation.

Each abutting component 141 is an elongated component that abuts the circumferential surfaces of the group of tires, or applies pushing force toward horizontal placement member 310 on the tire group. Although there is no particular limitation as to the specific shape of abutting component 141, in Example 1, abutting component 141 is a round bar. Abutting component 141 extends in the extension direction of placement component 310 of pallet 300 held by base 110.

Each separating device 142 causes abutting component 141 to swing in an arc about a rotation axis which is in the extension direction of abutting component 141 and is separated a predetermined distance from abutting component 141. Specifically, separating device 142 includes reduction gears and a rotary motor, and transfers the rotation of the rotary motor to abutting component 141 via the reduction gears and arm component 143. Separating device 142 can keep abutting component 141 abutted to the circumferential surfaces of the group of tires or keep abutting component 141 pressed against the circumferential surfaces of the group of tires, even when the diameters of tires 200 included in the group of tires are different within the predetermined range. Separating device 142 can continue to keep abutting component 141 abutted to the circumferential surfaces of the group of tires or keep abutting component 141 pressed against the circumferential surfaces of the group of tires, even during orientation switching of pallet 300 which holds the group of tires.

The direction in which separating device 142 causes abutting component 141 to move is not limited to swinging. For example, as in standing device 130 in Example 1, abutting component 141 may be made to move in a straight line toward the circumferential surfaces of the group of tires. Furthermore, the drive means of separating device 142 is not limited to a rotary motor and may be a device implemented by a linear motor, an air cylinder or the like.

Furthermore, each arm component 143 can adopt an arbitrary shape such as curved, straight, and so on. In particular, by adopting a bent shape such as in arm component 143 in Example 1, even if an obstruction such as a crosspiece (not shown in the figures) is present in pallet 300 held by base 110, it is possible to restrict mutual displacement of tires 200 while avoiding the obstruction.

According to orientation switching apparatus 100 according to Example 1, when leaning tires 201 are present at one end of a horizontally arranged group of tires, making leaning tires 201 stand upright before switching the orientation of pallet 300 to the vertical orientation makes it possible to prevent tires 200 from becoming displaced or falling off during or after orientation switching. In addition, by continuing the application of pushing force by standing device 130 from the one end of the group of tires toward vertical placement member 320 even after leaning tires 201 are made to stand, it is further possible to prevent tires 200 from becoming displaced or falling off.

With a stacked group of tires with almost no displacement of tires 200 as described above, the chuck attached to a crane can be easily inserted through the holes of the group of tires, and thus problems such as not being able to insert the chuck through the group of tires due to misalignment of tires 200 can be avoided and the efficiency of the carrying-out work for the group of tires can be improved.

By switching orientation while pushing against the circumferential surfaces of the group of tires using restricting device 140, the misalignment or falling off of tires 200 before, during, and after orientation switching can be prevented.

Furthermore, when the one end of the group of tires becomes leaning tires 201 after the orientation switching of vertically oriented pallets 300 holding the groups of tires in the stacked state, it possible to avoid storing the tires with leaning tire 201 in its leaning state by making leaning tires 201 stand upright using standing device 130.

Example 2

Next, another example of orientation switching apparatus 100 will be described. It should be noted that elements (parts) having the same operation and function, the same shape, mechanism, or structure as in Example 1 will be assigned the same reference sign and description may be omitted. Furthermore, description is carried out below focusing on the points that are different from Example 1, and overlapping description may be omitted.

Figure 7:
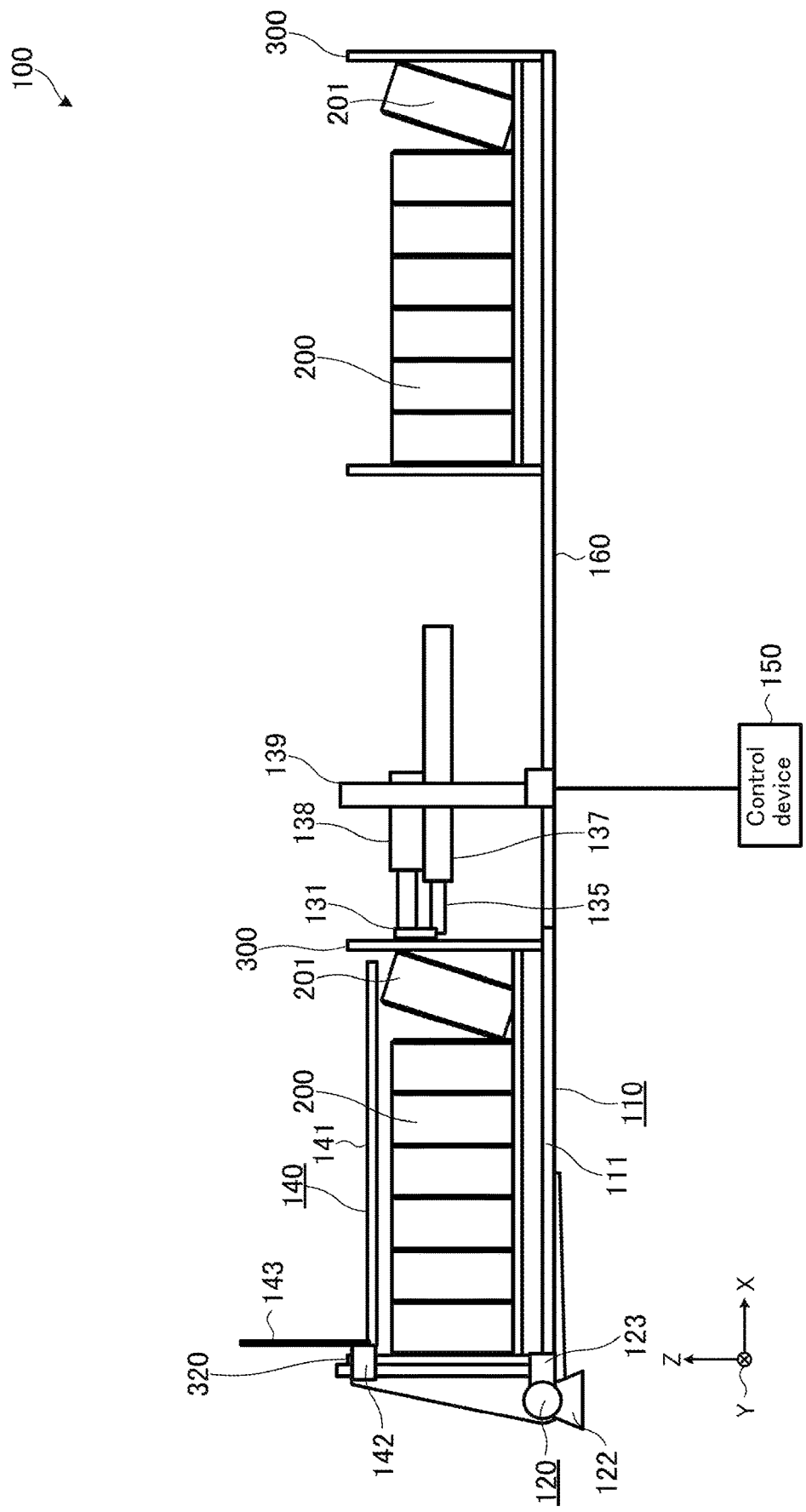
FIG. 7 is a side view of an orientation switching apparatus according to Example 2.

FIG. 7 is a side view of an orientation switching apparatus according to Example 2. As illustrated in FIG. 7, as in Example 1, orientation switching apparatus 100 is an apparatus that switches, from the horizontal orientation to the vertical orientation, the orientation of pallet 300 holding a plurality of tires 200, and includes base 110, switching drive device 120, standing device 130, and restricting device 140. In Example 2, orientation switching apparatus 100 further includes control device 150 and transport device 160.

In Example 2, as in Example 1, standing device 130 pushes leaning tire 201 located at one end of the group of tires toward the vertical placement member 320-side to cause leaning tire 201 to stand, and includes insertion component 135, pushing component 131, inserting device 137, pushing device 138, and lifting device 139.

Insertion component 135 is a component that is inserted through the hole of at least leaning tire 201. Although there is no particular limitation as to the shape of insertion component 135, a shape such as a round bar, a cylinder, or the like is preferable not to damage the inner circumference of tire 200 when tire 200 is lifted. Furthermore, insertion component 135 is set to a diameter that allows it to be inserted through the holes of tires 200 which have different diameters and are sequentially transported to orientation switching apparatus 100. In Example 2, insertion component 135 is set to a length that enables a plurality (for example, three) of tires 200 to be lifted. Insertion component 135 is set to a rigidity that enables a plurality of tires 200 to be lifted in a cantilever manner.

Pushing component 131 is a component that abuts the end surface of leaning tire 201 which is the surface on the one end-side. In Example 2, pushing component 131 pushes tire 200 straight in the arrangement direction of tires 200, from the outer-side of the one end of tires 200. Although there is no particular limitation as to the shape of pushing component 131, since pushing component 131 abuts the end surface of tires 200 of various diameters as described above, a plate-like component having an area (the area on the YZ plane in the figures) capable of abutting the end surface of any of tires 200 having various diameters is preferable.

Furthermore, it is preferable that the surface of pushing component 131 that abuts tire 200 be provided with a component that reduces friction between pushing component 131 and tire 200. For example, pushing component 131 may include a roller that rotates about an axis that extends parallel to the end surface of tire 200 in the horizontal plane.

Inserting device 137 is a device that inserts insertion component 135 through leaning tire 201 and removes insertion component 135 from leaning tire 201. In Example 2, using an air cylinder, inserting device 137 can advance insertion component 135 so that the tip of insertion component 135 advances up to the position of a third tire 200 from the nearest tire 200, and can retract insertion component 135 up to a position at which it does not interfere with pallet 300, and so on, when the orientation of pallet 300 is switched.

Pushing device 138 is a device that pushes the top portion of tire 200, which had been leaning tire 201, toward the other end (the negative X-axis direction in the figures) using pushing component 131, to adjust the position of tire 200. Although there is no particular limitation as to the type of pushing device 138, in Example 2, an air cylinder is used in the same manner as inserting device 137.

Although it is described in Example 2 that insertion component 135 and pushing component 131 are separate and capable of operating independently using inserting device 137 and pushing device 138, respectively, pushing component 131 may be a flange-shaped component which is fixed to insertion component 135 and projects outward from the outer circumference surface of insertion component 135. In this configuration, the device which generates the pushing for pushing component 131 to cause leaning tire 201 becomes inserting device 137, and pushing device 138 is realized by inserting device 137.

Lifting device 139 is a device that lifts and lowers insertion component 135, pushing component 131, inserting device 137, and pushing device 138. Lifting device 139 has the power to lift, all at once, the plurality of tires 200 through which insertion component 135 has been inserted. Although there is no particular limitation as to the type of lifting device 139, a device that includes a lifting mechanism such as a chain and a pulley, and drives the lifting mechanism using a motor is adopted in Example 2.

In Example 2, since pallet 300 on which tires 200 are placed is transported by transporting device 160, lifting device 139 can lift insertion component 135, which is not inserted through any tire 200, pushing component 131, inserting device 137, and pushing device 138 up to a position above an area through which pallet 300 on which tires 200 are placed passes.

Transporting device 160 is a device that transports pallet 300 in the arrangement direction of horizontally arranged tires 200 (the X-axis direction in the figures) up to the placement position of orientation switching apparatus 100. Although there is no particular limitation as to the type of transporting device 160, a conveyor is adopted in Example 2.

Control device 150 is what is called a computer that controls inserting device 137, pushing device 138, and lifting device 139, and causes leaning tire 201 to stand.

Figure 8:
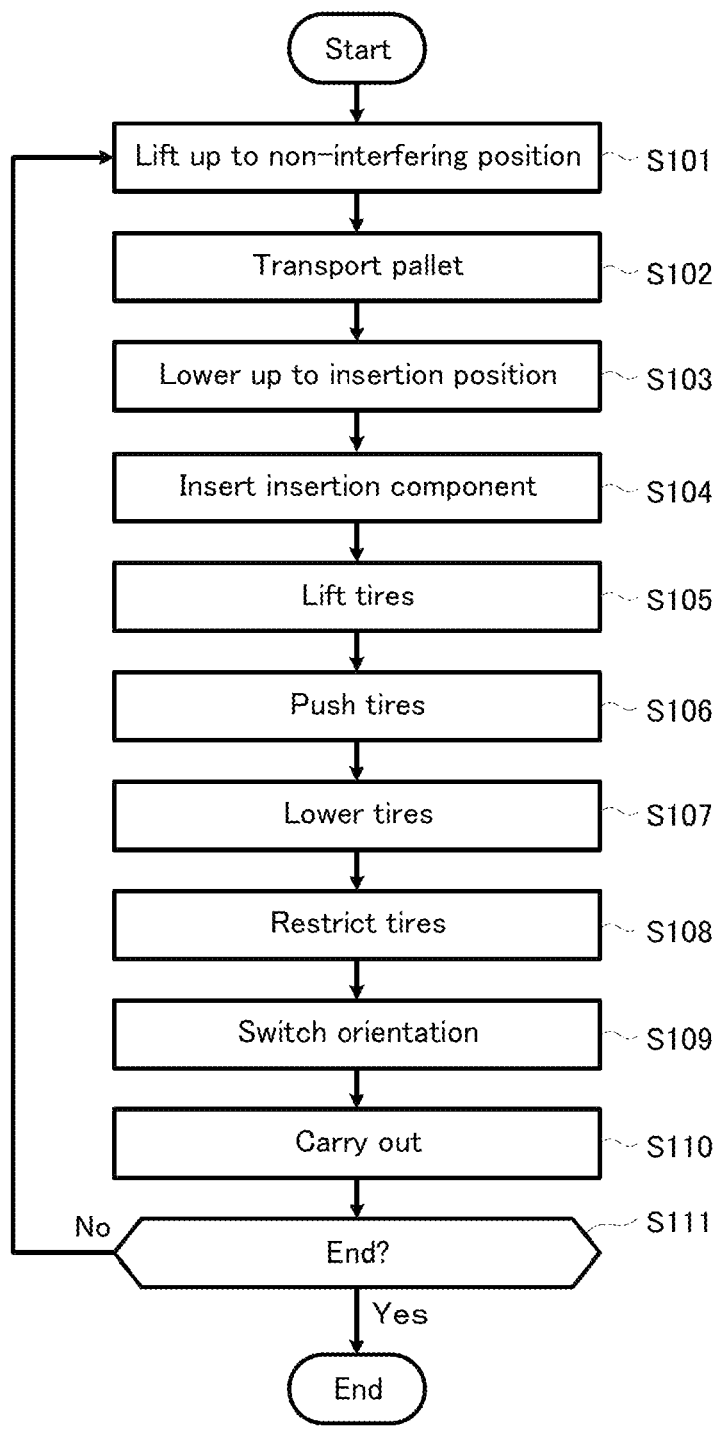
FIG. 8 is a flowchart showing the flow of operation of the orientation switching apparatus according to Example 2.

FIG. 8 is a flowchart showing the flow of operation of orientation switching apparatus 100 according to Example 2. As shown in the figure, before pallet 300 is transported to the orientation switching position, control device 150 causes lifting device 139 to lift insertion component 135, pushing component 131, inserting device 137, and pushing device 138 up to a position above the area through which pallet 300 on which tires 200 are placed passes (S101).

Next, transport device 160 transports the waiting pallet 300 up to the orientation switching position by passing it below insertion component 135, and so on (S102). The control of transporting device 160 may be executed by control device 150.

Figure 9:
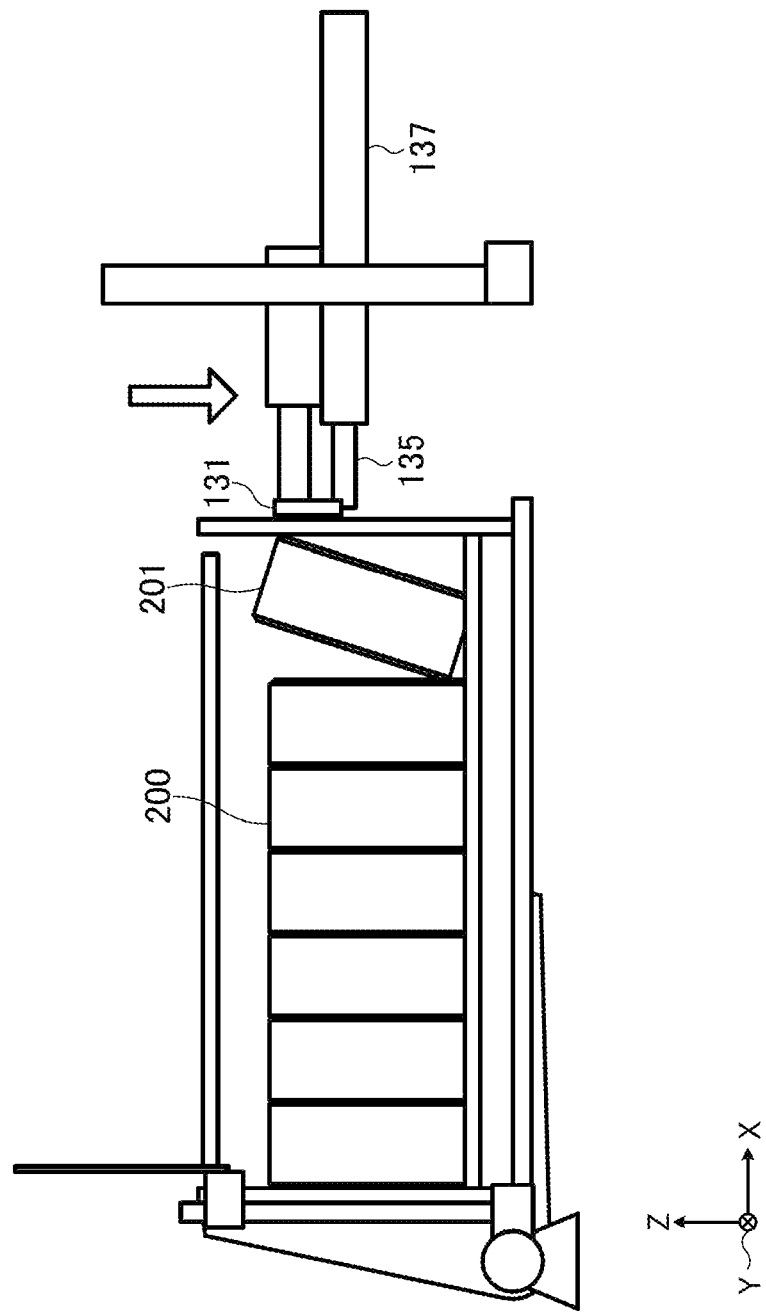
FIG. 9 is a first side view illustrating the flow of the operation of the orientation switching apparatus according to Example 2.

When pallet 300 is disposed at the predetermined position, control device 150 causes lifting device 139 to lower insertion component 135, and so on, up to a position at which insertion component 135 can be inserted through the holes of tires 200, as illustrated in FIG. 9 (S103).

Figure 10:
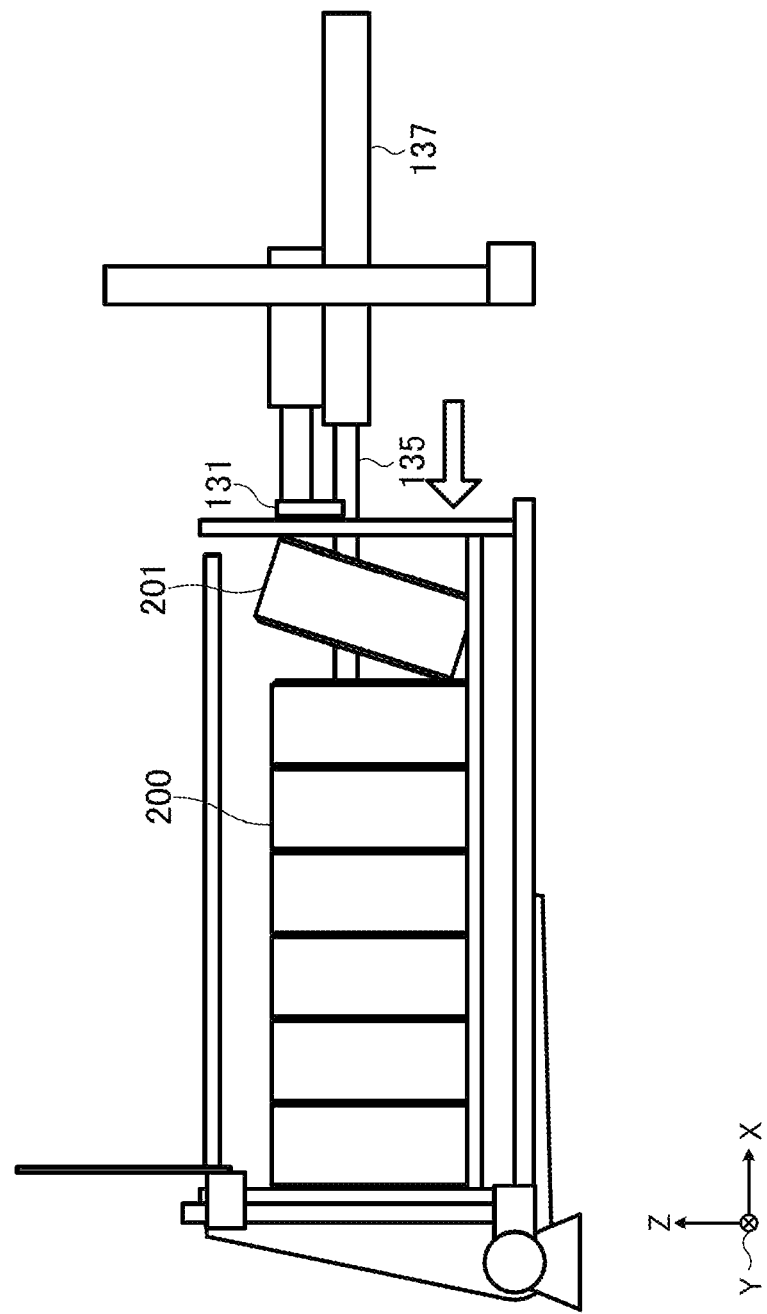
FIG. 10 is a second side view illustrating the flow of the operation of the orientation switching apparatus according to Example 2.

When insertion component 135 is lowered to the predetermined position, control device 150 causes inserting device 137 to insert insertion component 135 through the holes of a plurality of tires 200 as illustrated in FIG. 10 (S104).

Figure 11:
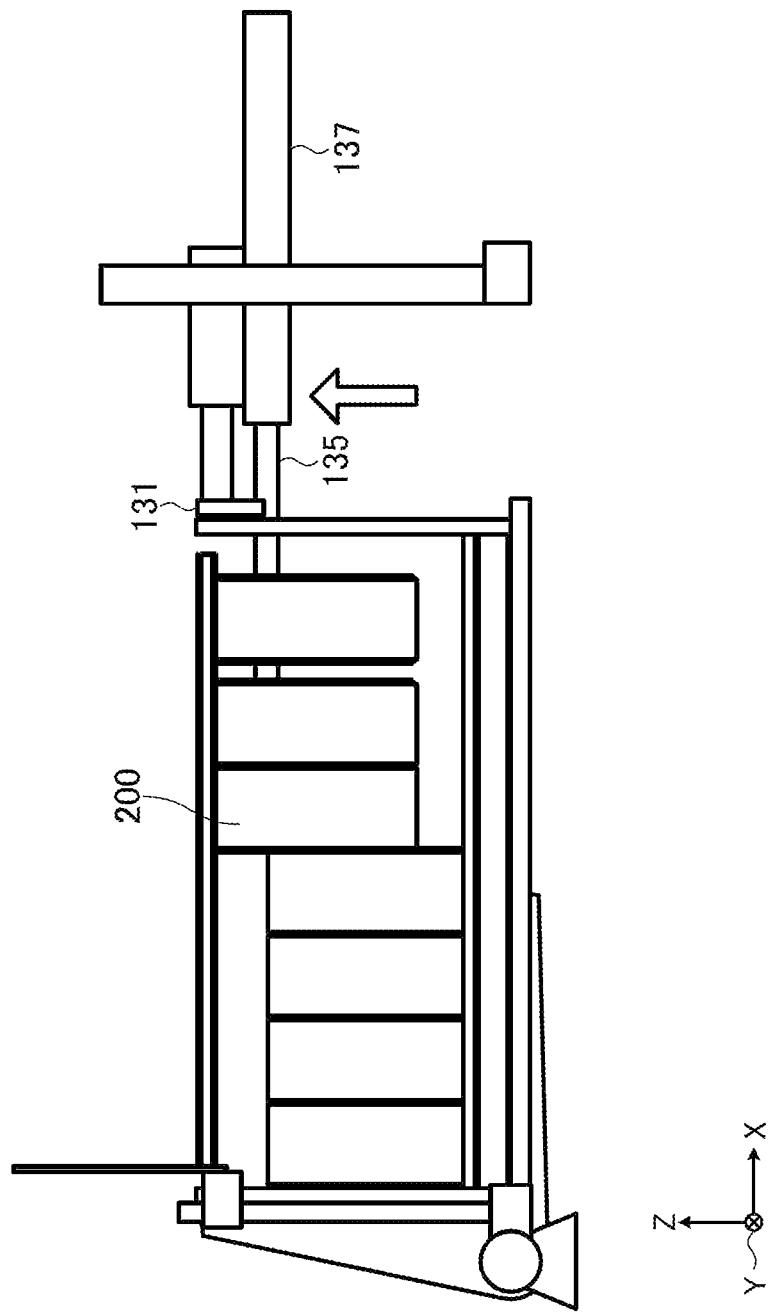
FIG. 11 is a third side view illustrating the flow of the operation of the orientation switching apparatus according to Example 2.

When the insertion of insertion component 135 is completed, control device 150 causes lifting device 139 to lift tires 200 as illustrated in FIG. 11 (S105). In the lifting, tires 200 are lifted until no longer in contact with pallet 300.

Figure 12:
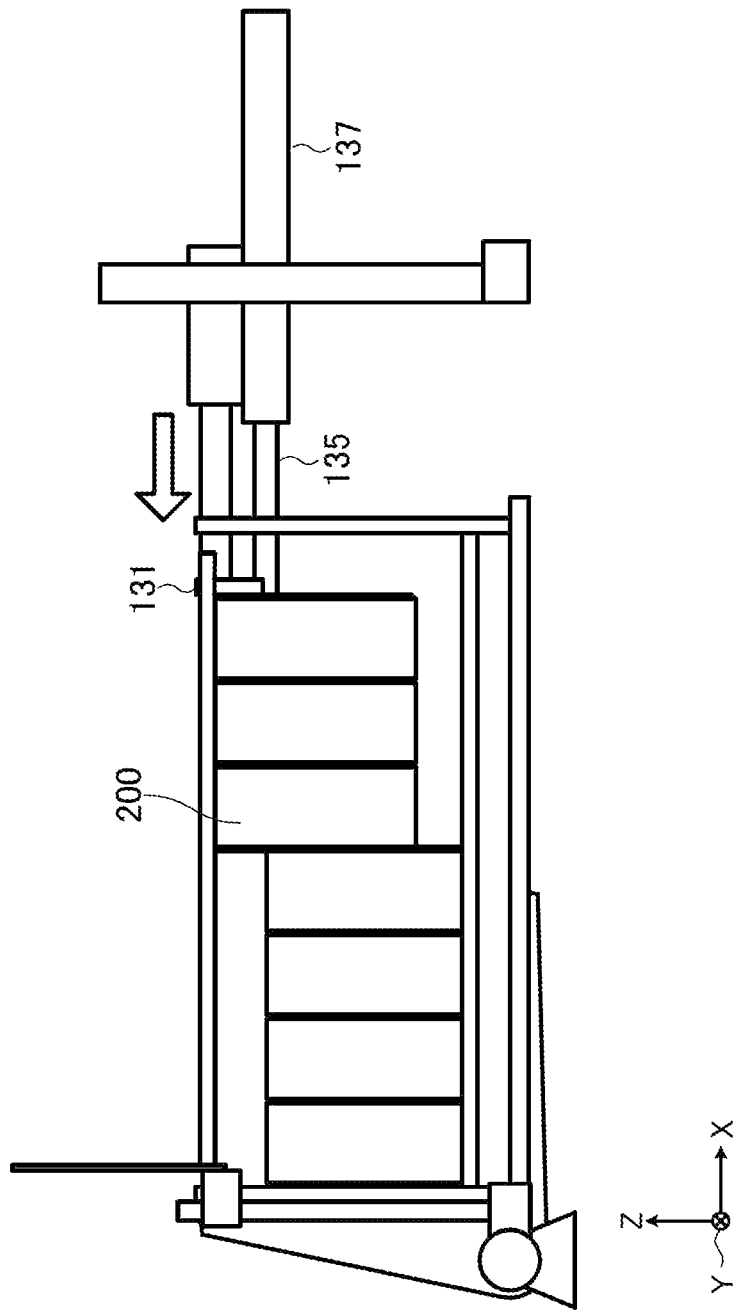
FIG. 12 is a fourth side view illustrating the flow of the operation of the orientation switching apparatus according to Example 2.

After lifting tires 200, control device 150 causes pushing device 138 to the push the lifted tires 200 against tires 200 that have not been lifted, using pushing component 131, as illustrated in FIG. 12 (S106).

Figure 13:
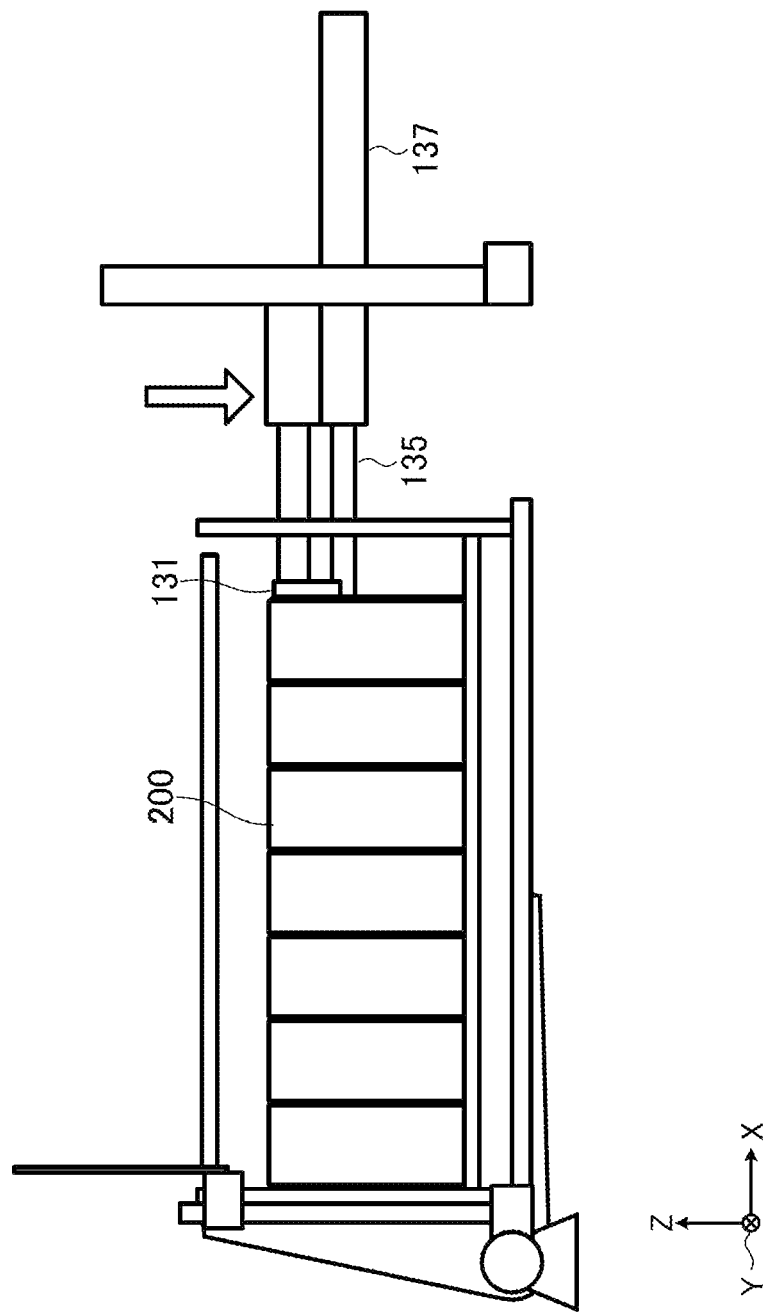
FIG. 13 is a fifth side view illustrating the flow of the operation of the orientation switching apparatus according to Example 2.

Next, as illustrated in FIG. 13, control device 150 causes lifting device 139 to lower tires 200 until the lifted tires 200 are placed again on pallet 300 (S107). After lowering, insertion component 135 and pushing component 131 are retracted.

Next, tires 200 are restricted using restricting device 140 (S108), and in the restricted state, the orientation of pallet 300 is switched to be vertical so that tires 200 are piled up in the stacked state (S109).

Next, tires 200 and pallet 300 are carried out using a crane, and so on (S110).

Next, when there is pallet 300 waiting for orientation switching (No in S111), the process returns to step S101. When there is no pallet 300 waiting (Yes in S111), the process ends.

As described above, by lifting leaning tire 201 to be dangling, leaning tire 201 can be placed to the vertical orientation without causing strong friction.

Furthermore, by lifting insertion component 135, pushing component 131, pushing device 138, and inserting device 137 up to a position above the passage area of pallet 300 using lifting device 139 which lifts leaning tire 201, pallet 300 whose orientation is to be switched next can be easily transported up to the orientation switching position.

Example 3

Next, another example of orientation switching apparatus 100 will be described. Elements (parts) having the same operation and function, the same shape, mechanism, or structure as in Examples 1 and 2 will be assigned the same reference sign and description may be omitted. Furthermore, description is carried out below focusing on the points that are different from Examples 1 and 2, and overlapping description may be omitted.

Figure 14:
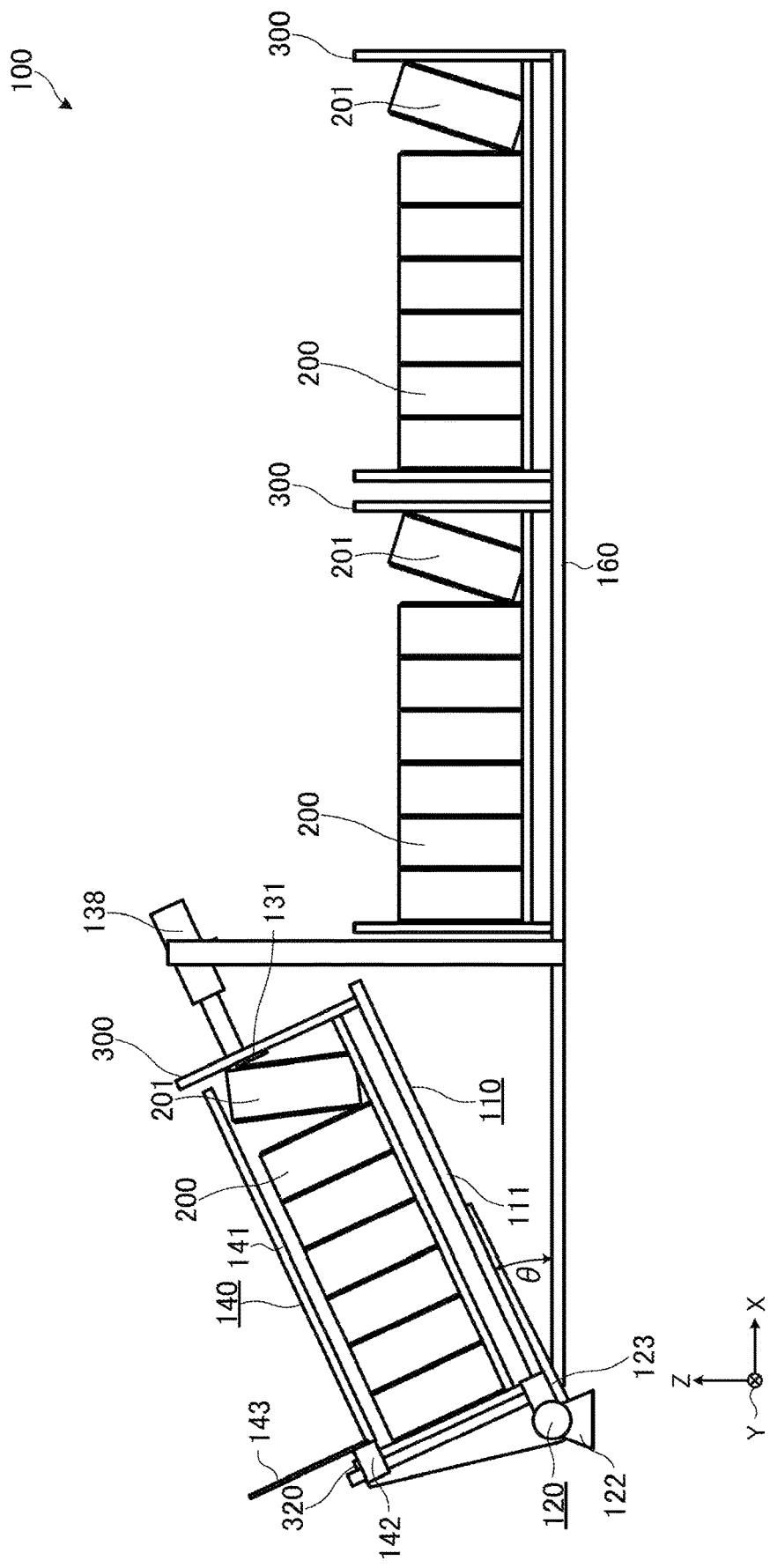
FIG. 14 is a side view of an orientation switching apparatus according to Example 3.

FIG. 14 is a side view of an orientation switching apparatus according to Example 3. As illustrated in FIG. 14, as in Examples 1 and 2, orientation switching apparatus 100 is an apparatus that switches, from the horizontal orientation to the vertical orientation, the orientation of pallet 300 holding a plurality of tires 200, and includes base 110, switching drive device 120, standing device 130, and restricting device 140. In Example 3, orientation switching apparatus 100 further includes transporting device 160.

In Example 3, standing device 130 is a device which is disposed at the one end of the group of tires which are in a tilted orientation, and pushes leaning tire 201 toward the vertical placement member 320-side to cause leaning tire 201 to stand. Standing device 130 includes pushing component 131, pushing device 138, and transporting device 160.

Pushing component 131 is a component that applies a pushing force toward the other end of the group of tires on leaning tire 201 disposed on pallet 300 which is placed in a tilted orientation (see FIG. 14) between the horizontal orientation and the vertical orientation by switching drive device 120. In Example 3 too, pushing component 131 pushes tire 200 straight in the arrangement direction of tires 200, from the outer-side of the one end of tires 200. However, since the group of tires are in a tilted orientation, pushing component 131 is disposed to be perpendicular to the arrangement direction of tires 200 in the tilted orientation. There are also configurations where an oscillating mechanism capable of swinging up and down is provided in the connection between pushing component 131 and pushing device 138, and pushing component 131 is not disposed perpendicular to the arrangement direction of tires 200.

Pushing device 138 pushes leaning tire 201 located on the one end of the group of tires in the tilted orientation, using pushing component 131. In Example 3, pushing device 138 adopts an air cylinder that advances and retracts pushing component 131 along the arrangement direction of the group of tires placed in the tilted orientation by switching drive device 120.

Pushing component 131 and pushing device 138 are disposed in a fixed manner above the passage area through which transport device 160 transports pallet 300. Specifically, pushing device 138 is disposed on an imaginary line extended from the row of tires 200 that are placed in the tilted orientation by switching drive device 120.

The lifting angle θ by which the group of tires is lifted by switching drive device 120 is at least an angle that allows pallet 300 loaded with tires 200 to pass below pushing component 131, and is preferably less than 45 degrees. This is because, when the group of tires including leaning tire 201 is tilted 45 degrees or more, unintended movement of leaning tire 201 may occur. In Example 3, lifting angle θ is set to 25 degrees.

Figure 15:
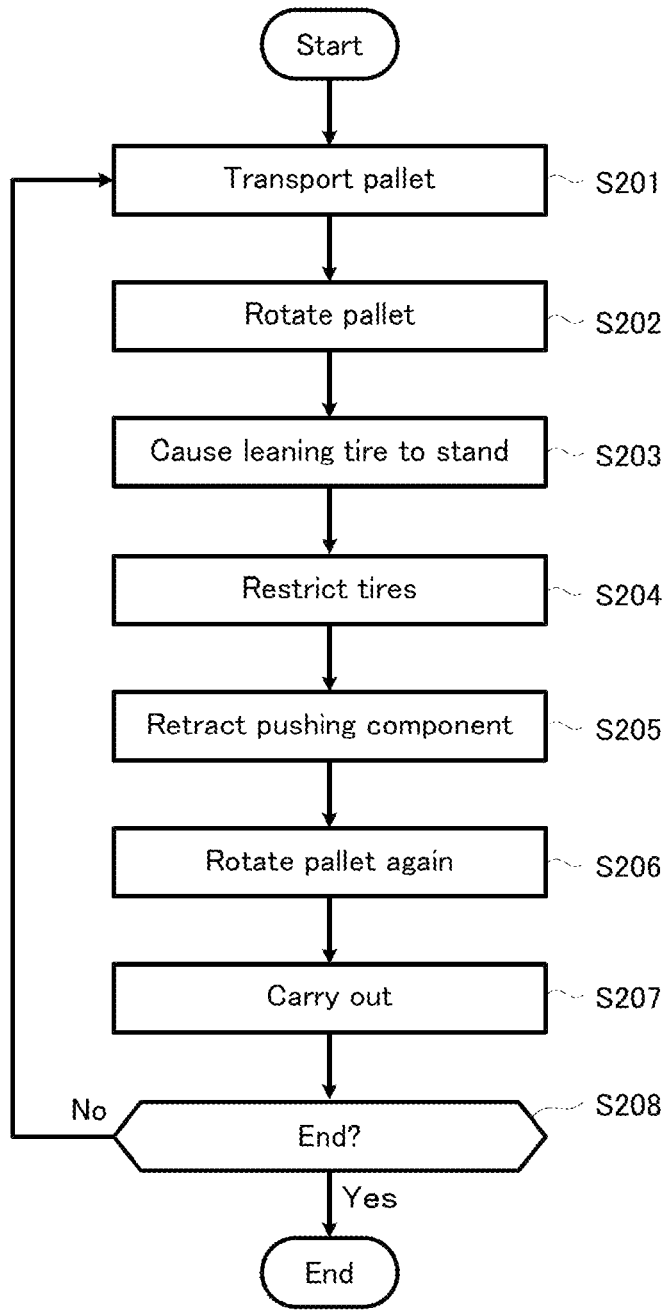
FIG. 15 is a flowchart showing the flow of operation of the orientation switching apparatus according to Example 3.

FIG. 15 is a flowchart showing the flow of operation of orientation switching apparatus 100 according to Example 3. As shown in the figure, transporting device 160 transports an awaiting pallet 300 up to the orientation switching position by passing it below pushing device 138 (S201). Control of transporting device 160 may be executed by control device 150 (not illustrated in the drawings in Example 3). Furthermore, other pallets 300 are also sequentially transported.

When pallet 300 is transported to the predetermined position, switching drive device 120, under control of control device 150, rotates pallet 300 up to the tilted orientation in which the pushing direction of pushing device 138 and the arrangement direction of tires 200 are aligned, as illustrated in FIG. 14 (S202).

Next, pushing device 138 pushes pushing component 131 against leaning tire 201 to cause leaning tire 200 to stand in the same orientation as the other tires 200 (S203).

Next, tires 200 are restricted by restricting device 140 (S204), and pushing device 138 retracts pushing component 131 up to a predetermined position at which pushing component 131 does not interfere with pallet 300 (S205). The timing of the restricting and the retracting may be simultaneous, or either one can be ahead of the other.

In the state where pallet 300 is restricted by restricting device 140, switching drive device 120 rotates pallet 300 again to make it stand vertical so that tires 200 are piled up in a stacked state (S206).

Next, tires 200 and pallet 300 are carried out using a crane, and so on (S207).

Next, when there is pallet 300 waiting for orientation switching (No in S208), the process returns to step S201. When there is no pallet 300 waiting (Yes in S208), the process ends.

According to orientation switching apparatus 100 according to Example 3, a waiting pallet 300 can be placed near holding component 111 without interfering with pushing component 131 and pushing device 138, pallet 300 can be efficiently sent off to the orientation switching position compared to Example 2.

Furthermore, since orientation switching apparatus 100 does not include inserting device 137 and lifting device 139, leaning tire 201 can be made to stand using a simple configuration.

This disclosure and our apparatus is not limited to the foregoing examples. For example, a different configuration realized by arbitrarily combining structural components described herein or by removing some structural components may be included. Furthermore, our apparatus also includes variations obtained by various modifications to the foregoing examples conceived by those skilled in the art without departing from the essence of our apparatus, that is, the meaning of the recitations of the claims.

Furthermore, it is possible to have standing device 130 operated only when leaning tire 201 is determined to be present based on information from a sensor that detects the presence of leaning tire 201 or image information of the one end of the tire group.

Furthermore, although orientation switching apparatus 100 in which two pallets 300 are joined and, together with 2 groups of tires, their orientations are switched in Example 1, orientation switching apparatus 100 may switch the orientation of a single pallet 300, or may switch the orientation of three or more pallets 300. Furthermore, when switching the orientation of a plurality of pallets 300, the orientation of pallets 300 that are different within an allowable range may be switched simultaneously. Furthermore, orientation switching apparatus 100 may switch the orientation of pallets 300 even when groups of tires having different diameters are held.

Furthermore, although the respective leaning tires 201 of two group of tires are made to stand using a single pushing component 131 in Example 1, orientation switching apparatus 100 may include two standing devices 130, and the respective standing devices 130 may make leaning tires 201 of the respective group of tires stand.

Furthermore, in the configuration in Example 1, leaning tire 201 may be made to stand by standing device 130 after the group of tires are placed in a tilted state.

INDUSTRIAL APPLICABILITY

Our apparatus can be used in a tire manufacturing factory, a tire storage warehouse, a tire distribution center, and so on.

The invention claimed is:

1. An orientation switching apparatus capable of placing a pallet that is in a horizontal orientation and holds a group of tires into a vertical orientation together with the group of tires, the group of tires being in a horizontally arranged state in which vertically oriented tires are lined up, the orientation switching apparatus comprising:
   a base configured to hold the pallet;
   a switching drive device configured to switch an orientation of the pallet that is held, by rotating the base;
   a standing device configured to push a leaning tire, which is a tire of the group of tires located at one end of the group of tires held in the pallet, toward another end of the group of tires to cause the leaning tire to stand; and
   a restricting device configured to restrict movement of the group of tires by abutting at least a portion of circumferential surfaces of the group of tires, wherein
   the standing device includes:
   a pushing component configured to apply, on the leaning tire, a pushing force toward the another end of the group of tires;
   an advancing device configured to advance and retract the pushing component between the leaning tire and the pallet; and
   a moving device configured to generate, for the pushing component that is in an advanced state, the pushing force toward the other end that is to be applied on the leaning tire.

2. The orientation switching apparatus according to claim 1, wherein the pushing component includes a roller configured to contact the leaning tire and roll.

3. The orientation switching apparatus according to claim 1, wherein the standing device is attached to the base and configured to move in conjunction with the switching of the orientation of the pallet.

4. The orientation switching apparatus according to claim 1, wherein the restricting device is attached to the base and configured to move in conjunction with the switching of the orientation of the pallet.

5. An orientation switching apparatus capable of placing a pallet that is in a horizontal orientation and holds a group of tires into a vertical orientation together with the group of tires, the group of tires being in a horizontally arranged state in which vertically oriented tires are lined up, the orientation switching apparatus comprising:
   a base configured to hold the pallet;
   a switching drive device configured to switch an orientation of the pallet that is held, by rotating the base;
   a standing device configured to push a leaning tire, which is a tire of the group of tires located at one end of the group of tires held in the pallet, toward another end of the group of tires to cause the leaning tire to stand; and
   a restricting device configured to restrict movement of the group of tires by abutting at least a portion of circumferential surfaces of the group of tires, wherein
   the standing device includes:
   an insertion component configured to be inserted through a hole of at least the leaning tire;
   a pushing component configured to abut an end surface on a one end-side of a tire that had been the leaning tire;
   an inserting device configured to insert the insertion component through the leaning tire, and remove the insertion component from the leaning tire;
   a pushing device configured to push the tire located at the one end of the group of tires toward the another end, using the pushing component; and
   a lifting device configured to lift and lower the insertion component, the pushing component, the inserting device, and the pushing device.

6. The orientation switching apparatus according to claim 5, further comprising:
   a control device, wherein the control device is configured to perform control to:
   insert the insertion component through the hole of at least the leaning tire, by controlling the inserting device;
   lift the insertion component and the inserting device until the at least the leaning tire through which the insertion component is inserted is lifted up, by controlling the lifting device;
   push the at least the leaning tire that has been lifted up using the insertion component toward the other end using the pushing component, by controlling the pushing device; and
   lower the insertion component and the inserting device until the at least the leaning tire that has been lifted up is placed on the pallet, by controlling the lifting device.

7. The orientation switching apparatus according to claim 6, further comprising:
   a transporting device configured to transport the pallet in an arrangement direction of the group of tires in the horizontally arranged state up to an orientation switching position, wherein
   the control device is configured to cause the lifting device to lift the insertion component, the pushing component, the pushing device, and the inserting device above a passage area through which the transporting device transports the pallet.

8. The orientation switching apparatus according to claim 5, wherein the pushing component includes a roller configured to contact the leaning tire and roll.

9. The orientation switching apparatus according to claim 5, wherein the standing device is attached to the base and configured to move in conjunction with the switching of the orientation of the pallet.

10. The orientation switching apparatus according to claim 5, wherein the restricting device is attached to the base and configured to move in conjunction with the switching of the orientation of the pallet.

11. An orientation switching apparatus capable of placing a pallet that is in a horizontal orientation and holds a group of tires into a vertical orientation together with the group of tires, the group of tires being in a horizontally arranged state in which vertically oriented tires are lined up, the orientation switching apparatus comprising:
   a base configured to hold the pallet;

a switching drive device configured to switch an orientation of the pallet that is held, by rotating the base;

a standing device configured to push a leaning tire, which is a tire of the group of tires located at one end of the group of tires held in the pallet, toward another end of the group of tires to cause the leaning tire to stand; and a restricting device configured to restrict movement of the group of tires by abutting at least a portion of circumferential surfaces of the group of tires, wherein the standing device includes:

a pushing component configured to apply, on the leaning tire, a pushing force toward the another end of the group of tires, the leaning tire being disposed on the pallet which is placed in a tilted orientation between the horizontal orientation and the vertical orientation by the orientation switching apparatus; and a pushing device configured to push the tire located at the one end of the group of tires toward the another end, using the pushing component.

12. The orientation switching apparatus according to claim 11, further comprising:

a transporting device configured to transport the pallet in an arrangement direction of the group of tires in the horizontally arranged state up to an orientation switching position, wherein the pushing component and the pushing device are disposed in a fixed manner above a passage area through which the transporting device transports the pallet.

13. The orientation switching apparatus according to claim 11, wherein the pushing component includes a roller configured to contact the leaning tire and roll.

14. The orientation switching apparatus according to claim 11, wherein the standing device is attached to the base and configured to move in conjunction with the switching of the orientation of the pallet.

15. The orientation switching apparatus according to claim 11, wherein the restricting device is attached to the base and configured to move in conjunction with the switching of the orientation of the pallet.

* * * * *